Jan. 30, 1934.　　　A. R. POWELL　　　1,944,903
REMOVAL OF NAPHTHALENE AND GUM FORMING CONSTITUENTS FROM GAS
Filed July 22, 1930
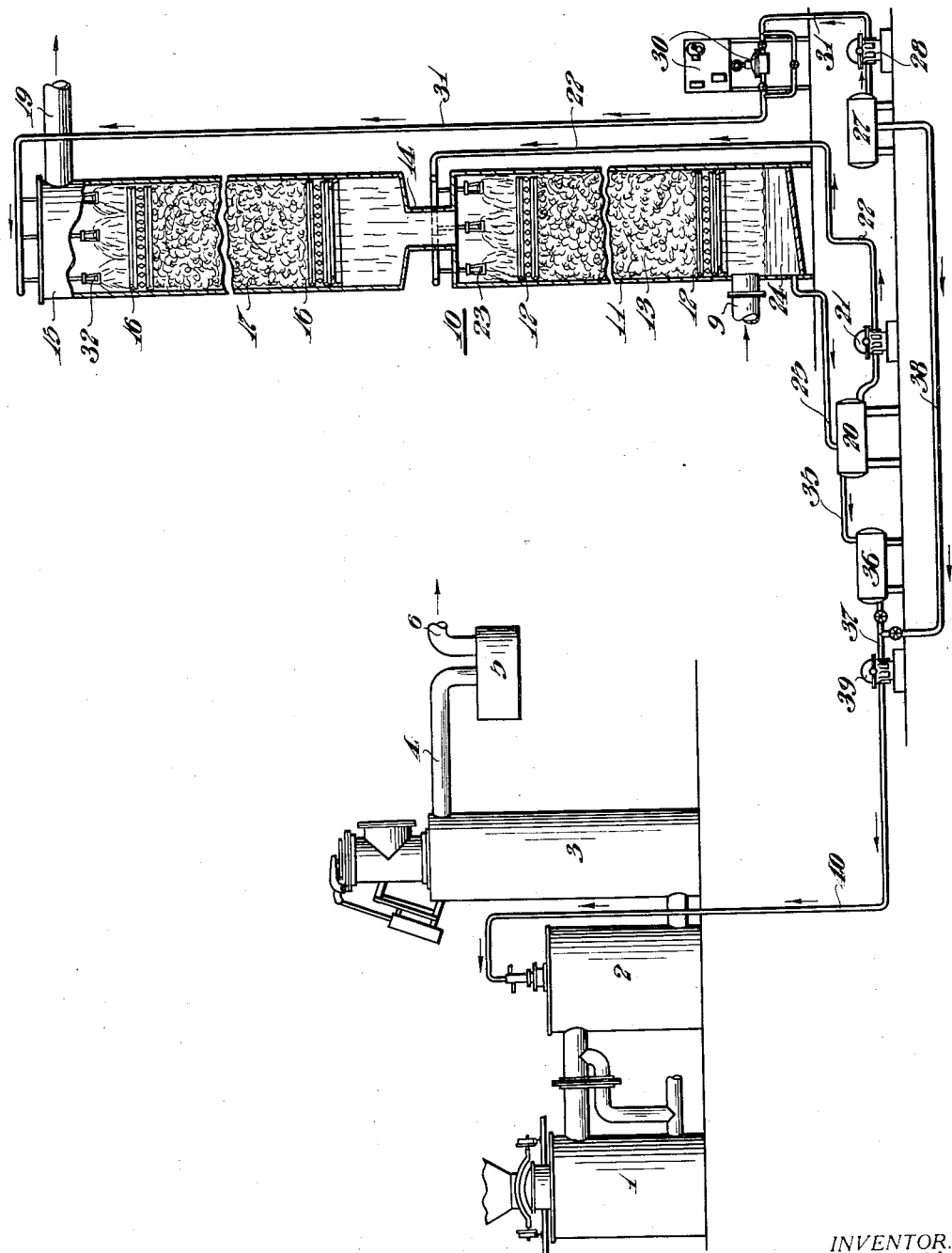
INVENTOR.
Alfred R. Powell.
BY Jesse R. Langley
ATTORNEY.

Patented Jan. 30, 1934

1,944,903

UNITED STATES PATENT OFFICE 1,944,903

REMOVAL OF NAPHTHALENE AND GUM-FORMING CONSTITUENTS FROM GAS

Alfred R. Powell, Elizabeth, N. J., assignor to The Koppers Company of Delaware, a corporation of Delaware Application July 22, 1930. Serial No. 469,820

2 Claims. (Cl. 183—114.6)

My invention relates to the removal of naphthalene and gum-forming constituents from fuel gases such as coke-oven gas, coal gas, carburetted water gas, etc., and especially to the removal of gum-forming constituents from wet fuel gases, such as carburetted water gas.

In the production of most types of fuel or illuminating gas, various benzanoid compounds are formed as constituents of the gas. These compounds include light oils such as benzol, toluol and the xylols, naphthalene, gum- and resin-forming compounds such as indene, styrene, and coumarone, and others.

Removal of the light oils may or may not be desirable, but it is well known that naphthalene and gum-forming constituents are potential sources of trouble on account of their tendency to cause stoppages in gas distributing systems. Consequently, removal of these constituents is essential to the satisfactory distribution and utilization of gas particularly when such utilization takes place at some distance from the gas-manufacturing plant.

The troublesome nature of deposits of naphthalene and the gummy or resinous material formed by condensation and polymerization of the gum-forming benzenoid constituents of the gas is well known. Naphthalene is a white crystalline solid at ordinary temperatures, and has a melting point of approximately 80° C. and a boiling point of approximately 218° C. at atmospheric pressure.

However, it occurs as a vapor in gas at temperatures considerably below its melting point, and at each temperature gas has a definite carrying capacity or saturation limit with respect to the naphthalene vapor. For example, 100 cu. ft. of dry gas is saturated by 25.2 grains of naphthalene vapor at 25° C. At 20° C. the saturation limit is 15.5 grains per 100 cu. ft., and at 15° C. it is 9.4 grains.

When gas saturated with naphthalene at any temperature below its melting point is cooled, the naphthalene vapor passes directly into the solid state and takes the form of very light flaky crystals. While the actual weight of these crystals is small, they occupy so large a space as to frequently obstruct the distributing mains and service apparatus and are extremely troublesome to gas manufacturers and consumers.

Naphthalene will pass directly from the crystalline solid state into the vapor state when it is slightly warmed or brought into contact with gas having a naphthalene content below its saturation limit. Consequently naphthalene which has been deposited in large mains in quantities too small to cause trouble may again evaporate and be carried farther out in the system with gas which reaches the original deposit in an unsaturated condition. The same naphthalene may then be redeposited when the gas is sufficiently cooled, and serious local stoppages may thus occur in a system which contains only a very small amount of naphthalene.

Naphthalene troubles are increased by the production and distribution of "dry" gas; that is, gas containing at most only small amounts of readily condensible oils. In the past gas has often contained such a quantity of these oils that when condensation of the naphthalene occurred oil was also condensed.

The amount of oil so condensed was in most cases sufficient to keep the naphthalene in solution so that it eventually found its way to the drains or drips and was removed from the system. Now, however, the gas frequently contains so little condensible oil that naphthalene stoppages and troubles may occur even when the gas leaving the works contains as little as 5 or 6 grains of naphthalene per 100 cu. ft.

Gum troubles in gas distributing systems somewhat resemble the naphthalene troubles described hereinabove. Gum troubles are due to the presence of certain constituents in the gas; especially troublesome are some of the unsaturated aromatic hydrocarbons such as indene and styrene, and certain other benzenoid compounds such as coumarone. Under certain conditions, these compounds are condensed from the gas and polymerized into resinous or gummy deposits, which may cause stoppage of mains, services and meters, or otherwise interfere with the satisfactory operation of the distributing system. Factors influencing the condensation and polymerization of these benzenoids are pressure, temperature, oxygen content and condensible oil content of the gas, etc.

Gummy and resinous deposits most frequently occur in the distribution of "wet" gases, such as carburetted water-gas from which large quantities of drip oil condense in the distributing system. Such deposits are rarely if ever found when dry gases, such as coke-oven gas, are distributed under normal conditions, and the same is true of water gas from which the condensate or drip oil is small in amount. For example, it has been found in a survey of several plants that all of the plants having bad gum trouble also had a drip oil production of 0.1 to 0.3 gallons per M cu. ft. of gas, while plants with smaller amounts of drip oil, about 0.02 gal. per M cu. ft or less, reported no gum trouble.

From the facts set forth it is seen that while gum troubles are similar to naphthalene troubles in that both are caused by constituents normally present in the gas in comparatively small amounts, and which are in the vapor state although at temperatures far below their boiling points, they also differ in that dry gas increases naphthalene troubles while tending to prevent gum troubles, and in other ways. Thus, it is sometimes desirable to remove naphthalene, sometimes gum-forming constituents, and sometimes both from the gas prior to the distribution thereof.

An object of my invention is to provide a process for the removal of gum-forming constituents from fuel gases, especially from "wet" fuel gases such as carburetted water gas of high condensible oil content.

A second object of my invention is to provide a process of removing gum-forming constituents from fuel gases that shall also remove naphthalene from said fuel gases, and suitable apparatus therefor.

A further object of my invention is to provide a method of operating naphthalene removal apparatus of the type in which naphthalene is removed from fuel gases treated therein by a countercurrent of absorbent oil, which method will also make possible the removal of gum-forming constituents from the gas treated to an extent never before attained in practice.

My invention has for further objects such other operative advantages and results as may hereinafter be found to obtain.

Indene and other gum-forming constituents are present in gas as manufactured to an extent dependent on the process of manufacture, the temperature of the gas, and various other factors. At any temperature, gas has a definite carrying capacity or saturation limit with respect to each of these compounds, and at ordinary temperatures this saturation limit is higher than in the case of naphthalene, because these compounds have a relatively higher vapor pressure.

For example, at 20° C. naphthalene has a vapor pressure of .053 mm. of mercury, while the vapor pressure of indene is approximately 1.0 mm., and of styrene approximately 4.9 mm. Thus, while a certain portion of the gum-forming benzenoids can be removed by cooling the gas, either indirectly or by direct contact with water, the best result obtainable by such cooling is the removal of such quantities of these compounds as occur in the gas in excess of its carrying capacity at the temperature imparted by the cooling process.

Since the carrying capacity of gas for these compounds is higher at any temperature generally encountered in gas distributing practice than it is for naphthalene, it is evident that removal of the gum-forming constituents by cooling is even less satisfactory than in the case of naphthalene. After any reduction in temperature that could economically be employed, the gas would still contain a sufficient quantity of these materials to cause trouble when condensed from the gas with the drip oil in outlying parts of the distributing system.

It has been found that the naphthalene remaining in gas after cooling to substantially atmospheric temperatures in the usual manner can be removed by scrubbing the gas with suitable oils, such as anthracene oil, kerosene oil, and various other oils in which the naphthalene is soluble. A particularly efficient process of removing naphthalene by contacting gas with a suitable oil has been described by F. W. Sperr, Jr., in U. S. Patent No. 1,578,687, issued March 30, 1926.

By the Sperr process naphthalene may be removed from manufactured gas to any extent necessary in order to prevent its deposition in distributing mains or connections. The process is especially characterized by the use of very small quantities of fresh absorbent oil to effect the desired reduction in the naphthalene content of large volumes of gas. For example, it has been found in practice that by means of the Sperr process 20 to 30 gallons, or even less, of fresh oil per million cu. ft. of gas treated, are sufficient under conditions frequently encountered to reduce the naphthalene content of fuel gas to 2 or 3 grains per 100 cu. ft. and sometimes less, and the removal can be efficiently carried further if desired.

Even when gas at unusually high temperatures is treated, or other severe conditions are encountered, it is seldom necessary to use more than 100 gallons of fresh oil per million cu. ft. of gas treated. This small oil consumption furthermore keeps the removal of oils from the gas very low, so that the loss in heating value of the gas caused by the naphthalene scrubber is negligible.

Because of the similarities of the problems involved, the apparatus used in the Sperr process of naphthalene removal is well suited to the removal of gum-forming constituents from gases. My present invention is a process that may preferably be conducted by means of the apparatus described in the above-mentioned patent to F. W. Sperr, Jr., and also described in his copending applications, No. 84,640 filed January 29, 1926, and No. 223,305, filed Oct. 1, 1927.

Accordingly, my process is preferably conducted in the following manner. Gas, such as carburetted water gas, containing objectionable quantities of gum-forming benzenoid constituents, is treated in the lower section of a tower containing two or more sections with a countercurrent of recirculating oil, which oil removes a portion of the gum-forming constituents from the gas. The gas then passes on into an upper section, in which it comes into intimate contact with a quantity of fresh oil sufficient to complete the removal of the gum-forming constituents to any desired extent. This fresh oil is usually added intermittently.

I have found that the quantity of fresh oil required to obtain this removal of the gum-forming constituents is much larger than the quantity required to remove naphthalene under similar conditions, and may be equal to the total quantity of oil used in carburetting the gas; for example, 3,000 gallons per million cu. ft. This experimentally determined fact can be demonstrated from theoretical grounds, as will be shown hereinbelow.

The fresh oil after contact with the gas in the last stage of the process is added to the oil recirculated over the earlier stage or stages, and the recirculating oil is thereby refreshed and enabled to continue the absorption of gum-forming constituents from the gas without further regeneration. Surplus oil, which overflows the circulating system because of the additions of fresh oil from the final stage, may be disposed of as desired, and is conveniently used to carburet further quantities of gas.

This comparatively heavy scrubbing of the gas with fresh oil incidentally removes substantially all of the naphthalene present, and may also remove considerable quantities of light oil. However, this removal of light oil is not a disadvantage in the present instance.

As has been stated above, plants where bad gum troubles are encountered may have drip oil production of approximately 0.3 gallon per M cu. ft., and this drip oil usually contains the troublesome gum-forming compounds. In many instances, gummy deposits have been traced directly to drip oil condensation, and plants with drip oil production of 0.02 gallon or less per M cu. ft. are seldom troubled with gummy or resinous deposits in their distributing systems.

Consequently, the removal of, say, 280 gallons of light oil per million cu. ft. of gas constitutes an extra precaution against gum troubles; wet gas is not desirable, nor in any way beneficial when naphthalene is not present, the gas suffers no actual B. t. u. loss, as the oil would separate out before reaching the consumer anyway; and the necessity of constant attention to drips and drains is eliminated.

It is known that when a constituent of a gas is removed therefrom by contacting the gas with a liquid in which the constituent is soluble, and the liquid containing the removed constituent is kept in contact with the same, or a further quantity of a gas, there is a definite relation between the amount of the constituent dissolved in the treating liquid and the amount of the constituent remaining in the gas.

For example, when gas containing naphthalene is treated with an oil in which some naphthalene is already dissolved, on account of the vapor pressure of the naphthalene dissolved in the oil there is a definite equilibrium between the amount of naphthalene in the oil and the amount of naphthalene in the gas in contact with the oil at any given temperature.

This means that when gas is brought into contact with oil containing naphthalene, the oil will either abstract naphthalene from the gas or give up naphthalene to the gas until this equilibrium is reached. At 22.8° C. for example, anthracene oil containing 8% naphthalene is in equilibrium with gas containing 7.7 grains naphthalene per 100 cu. ft. and kerosene oil and gas oil of the same naphthalene content are, respectively, in equilibrium with gas containing 10.2 grains and 12.7 grains of naphthalene per 100 cu. ft. At 27° C., kerosene containing 8% naphthalene is in equilibrium with gas containing 12.2 grains per 100 cu. ft., and at 32° C. the equilibrium is at 22 grains per 100 cu. ft.

When the kerosene contains 6% naphthalene, it is in equilibrium with gas containing 7.6 grains per 100 cu. ft. at 22.4°; with 4% in the oil, equilibrium is attained with 5.1 grains in the gas at the same temperature; and with 2% naphthalene in kerosene at this temperature; equilibrium is attained when the gas contains 2.6 grains of naphthalene per 100 cu. ft.

From such data, the operating conditions for gas treating apparatus such as that used in the Speer naphthalene removal process mentioned hereinabove may be calculated. By way of example, the gas to be treated may contain 30 grains of naphthalene per 100 cu. ft., which it is desired to reduce to 2 grains per 100 cu. ft., and the temperature of the gas averages 21° C. Gas oil is to be used for removing the naphthalene, and it is desired to discharge this with a naphthalene content of 8%.

Reducing the naphthalene content by 28 grains per 100 cu. ft. is equal to removing 40 lbs. of naphthalene per million cu. ft. of gas treated. If the 40 lbs. of naphthalene removed constitutes 8% of the spent oil discharged, the remainder of the spent oil amounts to 460 lbs. per million cu. ft. of gas treated, or about 66 gallons, and fresh oil additions to the system must be about 60 gallons per million.

At 21° C. gas oil containing 8% naphthalene is in equilibrium with gas containing about 12 grains per 100 cu. ft. The naphthalene content of the gas is then reduced from 30 grains to 12 grains by the recirculating oil in the lower section of the scrubber, and the 60 gallons of fresh gas oil per million cu. ft. of gas treated is more than sufficient to remove the remaining naphthalene from the gas in the fresh oil section of the scrubber.

In fact, in this instance smaller fresh oil additions and higher naphthalene content in the recirculated oil would give satisfactory results. Obviously if the naphthalene content of the gas were higher, or if the temperature of the gas leaving the scrubber were higher, larger quantities of fresh oil would be required.

I will now demonstrate that the experimentally determined fact that larger quantities of fresh oil are required for removal of gum-forming constituents than for similar removal of naphthalene is theoretically sound.

The efficiency with which constituents of a gas are absorbed from the gas by contact with an oil or other absorbent is determined by the effect of several interacting variables. These variables include time and intimacy of contact, nature of contact (i. e., countercurrent or otherwise), temperature and pressure at which absorption is practiced, vapor pressures of the absorbed constituent and of the absorbing oil, molecular weights of absorbed constituent and absorbing oil, solubility in the oil of the constituent absorbed (applies only when saturation is reached), etc.

However, in the present instance a comparison will be made between the absorption of naphthalene and the absorption of indene (a typical gum-forming constituent) by the same oil and under exactly the same conditions, to illustrate why more fresh oil is necessary for the removal of gum-forming constituents than for the removal of naphthalene.

It is assumed that the saturation point of the absorbent oil is not reached in either case, and that other conditions are identical. Then only two variables apply; namely, the molecular weights of the absorbed substances, and their vapor pressures at the temperature of absorption. This temperature may, for instance, be 20° C., and vapor pressures will then be 0.053 mm. for naphthalene and 1.0 mm. for indene. The molecular weights of naphthalene and indene are, respectively, 128 and 116.

According to the well known laws of physical chemistry, when other conditions are constant and the amounts of two constituents originally present in the gas are equal, the ratio of the quantities of an absorbent, in which both constituents in question are soluble, which are required to remove the two constituents from the gas to the same extent is directly proportional to their vapor pressures and inversely proportional to their molecular weights. When the two constituents are indene and naphthalene and the gas is at 20° C., the ratio becomes $$\frac{128}{116} \times \frac{1.0}{0.053} = 20.8;$$

that is, 20.8 times as much oil is required to remove indene from a gas as is required to remove naphthalene to the same extent.

Applying the same method to styrene, which is another gum-forming constituent and which has a vapor pressure of 4.9 mm. at 20° C. and a molecular weight of 104, the ratio becomes $$\frac{128}{104} \times \frac{4.9}{.053} = 114;$$

and in this case over 100 times as much oil must be used if satisfactory removal is obtained.

At higher temperatures larger quantities of oil are required to remove gum-forming constituents from gas, as in the case of naphthalene, and at other temperatures the ratio of the quantity of oil required for the removal of gum-forming constituents to the quantity required for the removal of a similar quantity of naphthalene may be somewhat different. However, at all temperatures the quantity of oil required for the removal of the indene, styrene, etc., is substantially the larger, and the ratios of quantities derived in the above examples can be taken as typical.

For example, if fresh oil additions of a certain gas oil totalling 60 gallons per million cu. ft. of gas treated are found to be necessary to reduce the naphthalene content of the gas from 30 grains per 100 cu. ft. to 2 grains per 100 cu. ft., more than 1200 gallons of the oil per million cu. ft. would be required to effect a similar reduction in the indene content, and more than 6,000 gallons per million cu. ft. would be required to effect a similar removal of styrene.

Fortunately it is only in rare instances that the removal of such a quantity of styrene is necessary. Indene is the gum-forming constituent most likely to predominate in the gases under consideration, such as carburetted water gas, and other constituents such as coumarone also require smaller amounts of fresh oil than styrene requires. Consequently it is often found that the use of 1,000 to 2,000 gallons of fresh oil per million cubic feet gives satisfactory removal of the gum-forming constituents, especially so since scrubbing with such quantities of fresh oil materially reduces the drip oil formation in the distributing system, and therefore helps prevent the troublesome depositions of any minute quantities of gummy or resinous material that may be left in the gas. However, under some circumstances it may be desirable to use the total quantity of carburetting oil, such as 3,000 gallons per million cu. ft. for the removal of gum-forming constituents and in other instances fairly small quantities of oil, (which are still, however, larger than the quantities required for equivalent naphthalene removal) such as 200 to 300 gallons per million cu. ft. may be satisfactorily employed.

Thus whereas in the Sperr naphthalene removal process the quantity of fresh oil used in treating a given volume of gas is characteristically less than 1% of the quantity of oil recirculated through that gas, in the present process of removing gum-forming constituents the fresh oil additions amount to more than 1% of the recirculated oil, and may amount to 25% or more. For example, 12,000 gallons of oil may be recirculated per million cu. ft. of gas treated by either process; much less than 120 gallons of fresh oil (1% of the quantity of recirculated oil) per million cu. ft. are generally required for removing naphthalene, but quantities up to 3,000 gallons or more of fresh oil per million cu. ft. are necessary for removing gum-forming constituents.

The fresh oil additions to the system are preferably intermittent and small in comparison to the volume of gas with which they come in contact. In order to bring about the most intimate and uniform contact possible between these small quantities of oil and the large volume of gas to be treated, I employ the principle of injecting oil at high rates for short periods of time and provide a permeable contact material such as steel turnings for holding the oil in the path of the gas. This principle of operation has been described in U. S. Patent No. 1,729,562 by Eugene H. Bird, and elsewhere.

Intermittent additions of oil to the scrubber are obviously subject to some variation as to size and frequency. For example, in the Sperr naphthalene removal process when one million cu. ft. of gas are being treated per hour, with addition of 60 gallons of fresh gas oil per hour, the intermittent additions or "shots" may be one per hour of 60 gallons, 2 per hour of 30 gallons each, 3 per hour of 20 gallons each, etc. The limiting frequency is that at which the minimum quantity of oil for efficient and uniform distribution over the contact material is delivered at each shot.

Similarly in my process when the same quantity of gas is being treated with, for instance, 300 gallons of oil per hour, a 150 gallon shot might be delivered every half hour, a 75 gallon shot every 15 minutes, a 25 gallon shot every 5 minutes, or a 5 gallon shot every minute, etc. Ordinarily it is better practice to make the shots more frequent than would be done for naphthalene removal rather than to increase the volume of each shot, within the limits set forth above.

The injection of fresh oil is intended to flush off the surface of the contact material and renew the layer of fresh oil exposed to the gas in the secondary section of the scrubber, and the use of more oil than is necessary for this purpose during each injection results in some of the fresh oil passing entirely through the secondary section before it has performed its function of removing the resin-forming constituents left in the gas after it has passed through the primary section.

With the objects set forth hereinabove and other objects in view, I now describe with reference to the accompanying drawing a preferred method by which my invention can be practiced. In the drawing, The single figure is a more or less diagrammatic view, partly in elevation and partly in vertical section of apparatus by means of which my improved process of manufacturing gas and removing gum-forming constituents and naphthalene therefrom may be practiced.

Water gas is produced in a generator 1, enriched by carburetting with oil in a carburetter 2, and passed through a superheater 3 in which at least a portion of the enriching oil is fixed in the gaseous state. The carburetted gas then passes through a pipe 4 to a wash-box 5, from which it is discharged through a pipe 6 for partial purification or other treatment prior to the removal of gum-forming compounds. This treatment should preferably include cooling and condensation for the removal of tar and ammonia.

The gas substantially free from tar and ammonia flows through a pipe 9 into a gum-removing scrubber 10 at the bottom of a lower section 11 and passes upwardly through the contact material with which the interior of the scrubber is packed, such as alternate layers of wooden hurdles 12 and steel turnings 13. In its passage through this tower packing, the gas comes into intimate contact with a countercurrent of recirculating oil, such as gas oil, which removes at least a portion of the gum-forming constituents and naphthalene from the gas.

The gas then continues through a passage 14 into the upper or final section 15 of the scrubber 10. In this section 15 the gas again passes through contact material such as alternate layers of wooden hurdles 16 and steel lathe turnings 17 with which the scrubber is packed, and receives a further treatment, this time with fresh oil, which completes the removal of naphthalene and gum-forming constituents from the gas. The gas then passes out of the scrubber through a pipe 19 and may be run into a storage holder, or distributed for domestic consumption, or otherwise disposed of, without difficulties from gummy, resinous or naphthalene stoppages.

The oil circulated over the lower section 11 of the scrubber 10 is withdrawn from a tank 20 by a pump 21 which delivers it through a pipe 22 and suitable distributing devices such as sprays 23 onto the contact materials 12 and 13 with which this section 11 of the scrubber is packed. The oil passes downwardly through the packing in countercurrent with the gas and collects in a sump 24 near the bottom of the scrubber 10. From this sump 24 the oil contaminated with constituents removed from the gas flows through a pipe 25 back to the circulating tank 20.

Fresh oil such as gas oil is stored in a tank 27 from which it is delivered, preferably intermittently, by a pump 28 controlled by an automatic regulating meter 30 or other suitable device, through a pipe 31 and sprays 32 or other distributing means onto the packing in the upper section 15 of the scrubber 10. This oil is used in whatever quantity is necessary to provide the desired removal of gum-forming constituents from the gas, which may be from 200 to 3000 gallons per million cu. ft. of gas treated, and the volume and frequency of the intermittent shots are regulated accordingly.

The fresh oil removes the gum-forming compounds remaining in the gas after passing through the lower section 11 of the scrubber 10. With the removed constituents in solution therein, the oil then flows down through the passage 14, and is mixed with the recirculated oil below the sprays 23, which oil it refreshes and assists in absorbing further quantities of gum-forming constituents from further quantities of gas.

The combined quantity of contaminated oil then collects in the sump 24 and flows through the pipe 25 to the tank 20, from which at least a portion of it is recirculated by the pump 21 as described hereinabove. Surplus oil overflows through a pipe 35 into a contaminated oil storage tank 36.

From the tank 36, the contaminated oil may be withdrawn through a pipe 37 by a pump 39 and delivered through a pipe 40 to the carburetter 2, wherein it is used to enrich further quantities of gas. If the supply of contaminated oil is not adequate to satisfy the plant's carburetting oil requirements, fresh oil may be withdrawn from the tank 27 through a pipe 38 and used to augment the supply of contaminated oil to whatever extent is necessary.

The function of the automatic regulating meter assembly 30 is to regulate the size and frequency of the shots of fresh oil delivered to the upper section 15 of the scrubber 10. This may be accomplished for example by an electric clock which makes a contact that starts the pump 28 at the desired intervals, and an automatic meter that shuts off the pump when the desired amount of oil has been delivered. Or some other suitable regulating device, such as a siphon tank, may be substituted for the regulating meter assembly 30 if desired.

Certain other modifications of the process and apparatus may in some cases be desirable. For instance, the tank 20 may be eliminated and the oil recirculated by the pump 21 from the sump 24, surplus oil being in that case discharged to the tank 36 from a higher point in the sump 24. Also the final section 15 of the scrubber 10 need not necessarily be placed on top of the first or lower section 11, although this is a preferred arrangement since it facilitates the addition of the comparatively fresh oil from the final section to the recirculated oil in the preceding section. Furthermore, either section of the scrubber may be divided into two or more sections, and other types and arrangements of contact material may be substituted for those described hereinabove.

Although a preferred application of my process is in the removal of gum- and resin-forming constituents such as indene, styrene, coumarone, etc., from fuel gases such as carburetted water gas prior to their distribution, whereby gum troubles in the distributing system are substantially eliminated, other useful results are also accomplished. For example, naphthalene and excessive drip oil are also removed from the gas before it leaves the plant, thereby obviating the possibility of other stoppage troubles and the necessity for frequently pumping the drip pots.

A further useful application of my invention is to secure the removal of gum-forming constituents and naphthalene from the gas before it is scrubbed for light oil removal, thereby greatly simplifying the subsequent purification of the light oil.

It will be obvious to those skilled in the art that various modifications may be made in the several parts of my apparatus and in the several steps of my process in addition to those mentioned hereinabove without departing from the spirit of my invention, and it is intended that the claims shall cover such changes as may reasonably be included within the scope thereof.

I claim as my invention:

1. The process of removing gum-forming compounds from fuel gas which comprises: scrubbing the gas with a large volume, per million cubic feet of gas, of solvent for gum-forming compounds which volume of solvent is substantially in equilibrium with the gas with respect to a predetermined content of light oil, and which is very large in comparison to the volume required to remove naphthalene to the same extent and of substantially the order of magnitude of a ratio that is directly proportional to the vapor pressures of naphthalene and of the gum-former and inversely proportional to their respective molecular weights and thereby substantially completely removing the gum-forming constituents from the gas.

2. The process of treating carburetted water gas which comprises: scrubbing the gas with a large volume recirculating, per million cubic feet of gas, of oil solvent for gum-forming compounds and naphthalene, said volume of oil being in equilibrium with the gas with respect to a predetermined content of light oil in the gas and being very large in comparison to the volume required to remove only naphthalene to the same extent and of substantially the order of magnitude of a ratio that is directly proportional to the vapor pressures of naphthalene and of the gum-former and inversely proportional to their respective molecular weights, and thereby substantially completely removing from the carburetted water gas gum-forming constituents, naphthalene, and excess oil condensible at distribution temperatures, while leaving the major portion of the light oil in the carburetted water gas, and intermittently adding fresh oil to the recirculating volume in quantities to maintain said ratio and thereby keeping the recirculating volume reasonably fresh.

ALFRED R. POWELL.